United States Patent
Terasawa

(10) Patent No.: US 12,291,310 B1
(45) Date of Patent: May 6, 2025

(54) FLOATING PLATFORM, ANCHOR CONTAINER STRUCTURE, FLOATING STRUCTURE, AND INSTALLATION METHOD FOR INSTALLING FLOATING PLATFORM ON WATER

(71) Applicant: TERASUN Co. Ltd., Yokohama (JP)

(72) Inventor: Hideki Terasawa, Yokohama (JP)

(73) Assignee: TERASUN Co. Ltd., Yokohama (JP)

( * ) Notice: Subject to any disclaimer, the term of this patent is extended or adjusted under 35 U.S.C. 154(b) by 0 days.

(21) Appl. No.: 18/874,416

(22) PCT Filed: Jan. 30, 2024

(86) PCT No.: PCT/JP2024/002862
§ 371 (c)(1),
(2) Date: Dec. 12, 2024

(87) PCT Pub. No.: WO2025/062676
PCT Pub. Date: Mar. 27, 2025

(30) Foreign Application Priority Data

Sep. 19, 2023 (JP) ................................. 2023-151768

(51) Int. Cl.
*B63B 21/20* (2006.01)
*B63B 21/00* (2006.01)
*B63B 75/00* (2020.01)

(52) U.S. Cl.
CPC .............. *B63B 21/20* (2013.01); *B63B 75/00* (2020.01); *B63B 2021/003* (2013.01); *B63B 2021/203* (2013.01)

(58) Field of Classification Search
CPC ... B63B 21/20; B63B 75/00; B63B 2021/003; B63B 2021/203; B63B 21/502
See application file for complete search history.

(56) References Cited

U.S. PATENT DOCUMENTS

| 8,698,338 | B2 * | 4/2014 | Slocum | .................. F03B 13/06 |
| | | | | 290/53 |
| 11,713,098 | B2 * | 8/2023 | Aubeny | .................. B63B 21/26 |
| | | | | 114/296 |

(Continued)

FOREIGN PATENT DOCUMENTS

| EP | 4098538 A1 | 12/2022 |
| JP | H09-209347 A | 8/1997 |

(Continued)

OTHER PUBLICATIONS

GICON-SOF; "A modular and cost competitive TLP Solution"; GICON; pp. 1-12.

(Continued)

*Primary Examiner* — Anthony D Wiest
(74) *Attorney, Agent, or Firm* — Studebaker Brackett PLLC

(57) ABSTRACT

A floating platform (2) includes: a floating structure (3) configured to support a tower (1) and placed on water by means of taut mooring; an anchor container structure (4) including a plurality of containers (17); and a plurality of tethers (5) connecting the floating structure (3) and the anchor container structure (4). Each of the containers (17) is fixed to at least one of the tethers (5) and placed on a water bottom. Each of the containers (17) includes: a bottom; a container outer wall provided around a periphery of the bottom; and a container inner wall provided to face the container outer wall. The bottom, the container outer wall, and the container inner wall form a housing space. Heavy materials are contained in the housing space. The heavy materials include at least one of soil, sand, gravel, crushed stone, and concrete pieces.

11 Claims, 12 Drawing Sheets

(56) References Cited

U.S. PATENT DOCUMENTS

| | | | |
|---|---|---|---|
| 11,897,585 B1* | 2/2024 | Falzone | B63B 21/27 |
| 2014/0014021 A1* | 1/2014 | Tomas | B63B 21/20 |
| | | | 114/294 |
| 2020/0391834 A1 | 12/2020 | Colmard et al. | |
| 2023/0064994 A1 | 3/2023 | Featherstone et al. | |

FOREIGN PATENT DOCUMENTS

| | | | |
|---|---|---|---|
| JP | 2012-201191 A | 10/2012 |
| JP | 5565803 B2 | 8/2014 |
| JP | 2015-037935 A | 2/2015 |
| JP | 2016-068944 A | 5/2016 |
| JP | 2017-505262 A | 2/2017 |
| JP | 2023-523500 A | 6/2023 |
| JP | 2023-106292 A | 8/2023 |

OTHER PUBLICATIONS

"TLP concept of FOWT suitable for characteristics of Japan"; MODEC Inc.; Jul. 7, 2022; pp. 1-10.

International Search Report issued in PCT/JP2024/002862; mailed Apr. 16, 2024; with concise English language translation.

Written Opinion of the International Searching Authority issued in PCT/JP2024/002862; mailed Apr. 16, 2024; with concise English language translation.

"Notice of Reasons for Refusal" Office Action issued in JP 2023-151768; mailed by the Japanese Patent Office on Dec. 11, 2023.

"Decision to Grant a Patent" Office Action issued in JP 2023-151768; mailed by the Japanese Patent Office on Jan. 29, 2024.

* cited by examiner

A-A cross-sectional view

Plan view

B-B cross-sectional view

FLOATING PLATFORM, ANCHOR CONTAINER STRUCTURE, FLOATING STRUCTURE, AND INSTALLATION METHOD FOR INSTALLING FLOATING PLATFORM ON WATER

TECHNICAL FIELD

The present disclosure relates to a floating platform, anchor container structure, floating structure, and installation method for installing a floating platform on water.

BACKGROUND ART

A taut mooring method is known in which piles driven from the bottom of water to the bedrock or heavy objects installed on the bottom of water are connected to a floating structure floating on the water surface by a tether such as a chain, wire, or rope, and the floating structure is pulled into the water by a force stronger than the weight of the tether itself to suppress motions of the floating structure.

For floating platforms that support a tall tower, minimizing motions is important for the quality of floating platforms. For example, when mounting a tower for offshore wind power generation, the motions greatly affect the efficiency of power generation and the stable operation of the equipment. In this regard, taut mooring is the ideal mooring method. Minimizing the area occupied by the entire floating platform, including not only the water surface where the floating structure resides but also the water bottom and underwater where the mooring device is installed, is also important to minimize the impact on the local fishing industry, which originally shared the same water area. Taut mooring is a very effective mooring method in this respect as well, because mooring devices such as chains are placed only directly under the floating platform and are not widely deployed on the seabed or in the sea.

PRIOR ART DOCUMENTS

Patent Document 1: Japanese Patent No. 5565803
Non-Patent Document 1: "TLP concept of FOWT suitable for characteristics of Japan", 7 Jul. 2022 MODEC Inc.
Non-Patent Document 2: GICON-SOF, "A modular and cost competitive TLP Solution", GICON

SUMMARY OF THE INVENTION

Problem to be Solved by the Invention

In taut mooring, it is necessary to install a solid foundation on the seabed to not only support the initial tension on the tethers but also to withstand buoyancy and drift forces generated by waves, swells, and tsunamis. Conventionally, as described in Non-Patent Document 1, multiple piles were driven deeper into the ground from the seabed to form the foundation. However, driving piles into the deep ocean floor is difficult and large-scale work, and the high construction cost becomes problematic. The gravity-type taut mooring systems described in Patent Document 1 and Non-Patent Document 2 were devised to improve this problem. However, these gravity-type taut mooring systems are heavy, huge concrete structures, and thus the construction and installation costs are high. In particular, the most important load to consider when installing a tower for offshore wind power generation is the horizontal wind pressure applied to the top of the tower during typhoons. To support this pressure, a huge concrete structure must be installed on the seabed to withstand the large overturning moment. The construction and installation costs of this huge concrete structure are problematic, and thus the gravity-type taut mooring systems disclosed in Patent Document 1 and Non-Patent Document 2 have not been put to practical use.

The present disclosure aims to provide a floating platform and an installation method for installing a floating platform on water, which can reduce construction and installation costs.

A floating platform according to one aspect of the present disclosure comprises: a floating structure configured to support a tower and placed on water by means of taut mooring; an anchor container structure comprising a plurality of containers; and a plurality of tethers connecting the floating structure and the anchor container structure. Each of the plurality of containers is fixed to at least one of the plurality of tethers and placed on a water bottom. Each of the plurality of containers comprises: a bottom; a container outer wall provided around a periphery of the bottom; and a container inner wall provided to face the container outer wall. The bottom, the container outer wall, and the container inner wall form a housing space. Heavy materials are contained in the housing space, and the heavy materials include at least one of soil, sand, gravel, crushed stone, and concrete pieces.

The bottom may have an opening. The container inner wall may be provided around an inner circumference of the bottom. Each of the plurality of containers may further comprise a tether support member which is formed on the container inner wall and fixed to the at least one of the tethers.

The container inner wall may comprise a cavity opened at its top and communicated with the opening.

An inner surface of the container inner wall facing the container outer wall may be inclined with respect to a vertical direction of the container. A distance between the container inner wall and the container outer wall in a horizontal direction perpendicular to the vertical direction may gradually decrease toward the bottom.

The tether support member may comprise: a first tether support member formed on the container inner wall and fixed to one of the tethers; and a second tether support member formed on the container inner wall and fixed to another one of the tethers.

The floating structure may comprise: a core column configured to support the tower; a plurality of arms extending radially from the core column or from a vicinity of the core column; a stage fixed to the core column; a plurality of first braces each connected to a corresponding one of the arms and either the stage or the core column; a plurality of second braces each connected to two adjacent ones of the arms; a plurality of tether securing devices each configured to secure a corresponding one of the tethers; and a plurality of tether winders each configured to wind up the corresponding one of the tethers.

The floating structure may further comprise: a plurality of grips each connected to one end of one of the arms, wherein an axial direction of each of the grips is orthogonal to an axial direction of the corresponding arm; and a plurality of guides each arranged on a corresponding one of the grips, wherein each of the guides contacts a corresponding one of the tethers and is configured to change an extension direction of the corresponding tether. The tether securing devices and the tether winders may be arranged on the stage.

A nacelle and blades may be attached to the tower. The floating platform may be a platform for offshore wind power generation.

An anchor container structure according to one aspect of the present disclosure is connected to a floating structure through a plurality of tethers. The floating structure is configured to support a tower and placed on water by means of taut mooring. The anchor container structure comprises a plurality of containers. Each of the plurality of containers is fixed to at least one of the tethers and placed on a water bottom. Each of the plurality of containers comprises: a bottom; a container outer wall provided around a periphery of the bottom; and a container inner wall provided to face the container outer wall. The bottom, the container outer wall, and the container inner wall form a housing space. Heavy materials are contained in the housing space, and the heavy materials include at least one of soil, sand, gravel, crushed stone, and concrete pieces.

A floating structure according to one aspect of the present disclosure is placed on water by means of taut mooring and configured to support a tower. The floating structure comprises: a core column configured to support the tower; a plurality of arms extending radially from the core column or from a vicinity of the core column; a plurality of grips each connected to one end of one of the arms, wherein an axial direction of each of the grips is orthogonal to an axial direction of the corresponding arm; a stage fixed to the core column; a plurality of first braces each connected to a corresponding one of the arms and either the stage or the core column; a plurality of second braces each connected to two adjacent ones of the arms; and a plurality of tether securing devices each configured to secure a corresponding one of the tethers.

An installation method according to one aspect of the present disclosure for installing the floating platform on water by means of taut mooring, comprises: towing the floating structure to a planned installation location in such a state that the anchor container structure comprising the containers is positioned directly under the floating structure, and the floating structure is floating at a first draft line; placing the containers on a water bottom by paying out the tethers into the water at the planned installation location; dropping the heavy materials into the housing space of each of the containers which is placed at the water bottom, wherein the heavy materials include at least one of soil, sand, gravel, crushed stone, and concrete pieces; winding up the tethers; submerging the floating structure to a second draft line that is deeper than the first draft line; adjusting tensions of the tethers such that the tensions of the tethers are set to a certain value; and securing each of the tethers to the floating structure.

Advantageous Effect of the Invention

According to the present disclosure, it is possible to provide a floating platform and an installation method for installing a floating platform on water, which can reduce construction and installation costs.

DESCRIPTION OF THE EMBODIMENTS

The floating platform according to the embodiment will be described with reference to the drawings.

Figure 1:
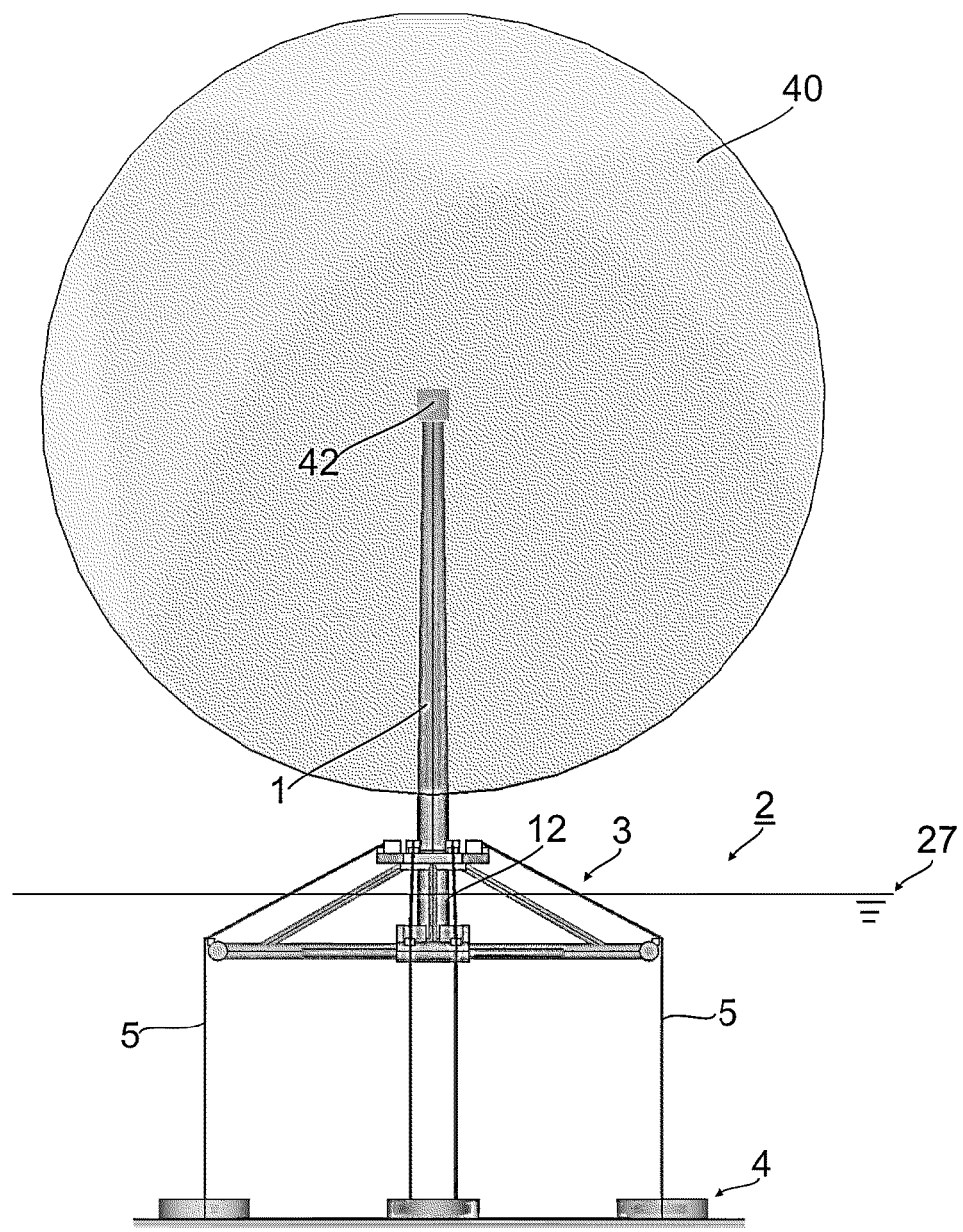
FIG. 1 illustrates an overall view of a floating platform for supporting a tower according to the embodiment.

FIG. 1 illustrates an overall view of a floating platform 2 for supporting a tower 1 according to the embodiment. In this embodiment, the floating platform 2 supports a large offshore wind power generator and floats with a second draft line 27 as the water surface. The tower 1 may be mounted with a nacelle 42 and blades 40.

Figure 2:
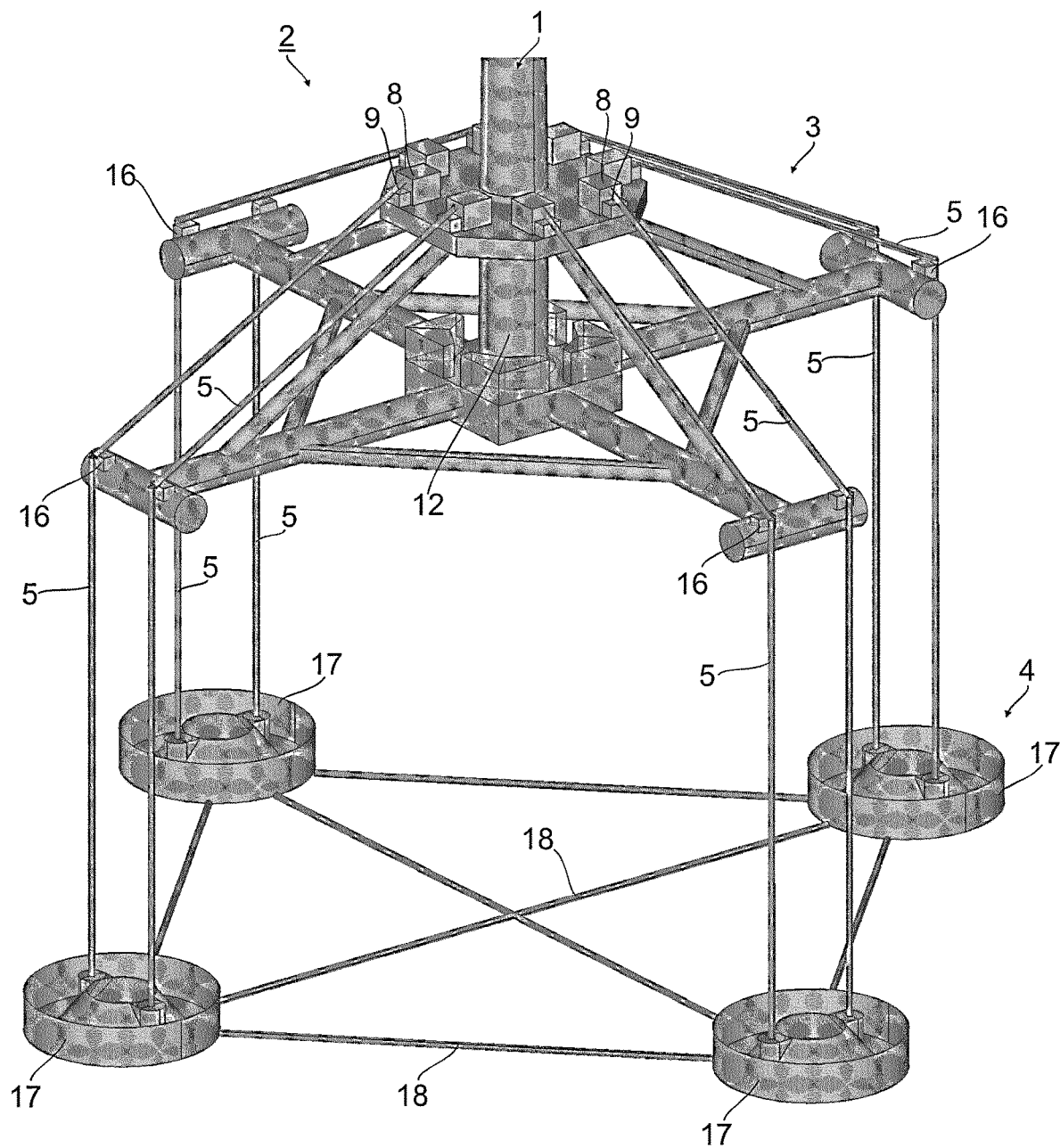
FIG. 2 illustrates a perspective view of the floating platform according to the embodiment.

FIG. 2 illustrates a perspective view of the floating platform 2 that supports the tower 1. The floating platform 2 includes: a floating structure 3 configured to support the tower 1, an anchor container structure 4 including a plurality of containers 17 (four containers 17 in this embodiment); and a plurality of tethers 5 connecting the floating structure 3 and the anchor container structure 4. In this embodiment, each of the four containers 17 is connected to the floating structure 3 via two tethers 5. The mooring method of the floating platform 2 is a gravity-type taut mooring method. In this method, the floating structure 3 and the anchor container structure 4 where heavy materials such as earth and sand are contained in the containers 17 are connected by the tethers 5. The lower part of the floating structure 3 is pulled into the sea by applying initial tension to the tethers 5. Thus, the floating structure 3 is placed on water while moored by the taut mooring method. The heavy materials include at least one of soil, sand, gravel, crushed stone, and concrete pieces. The conventional gravity-type taut mooring system described in Patent Document 1 and Non-Patent Document 2 is a heavy and huge concrete structure. Thus, the construction cost of the concrete structure itself is expensive, including the cost of materials such as concrete and steel bars for supporting concrete, the cost of producing and installing formwork for pouring concrete, and concrete pouring operation cost. On the other hand, the unit cost of heavy materials such as earth and sand is generally a fraction of that of concrete. Accordingly, the method of securing the weight of the anchor container structure 4 by placing earth and sand into the containers 17 of the anchor container structure 4 installed on the seabed is advantageous in reducing the construction cost.

Rope, wire, or chain may be employed as the tether 5, depending on the maximum tension that can be loaded on the tether 5.

(The Anchor Container Structure 4)

Figure 3:
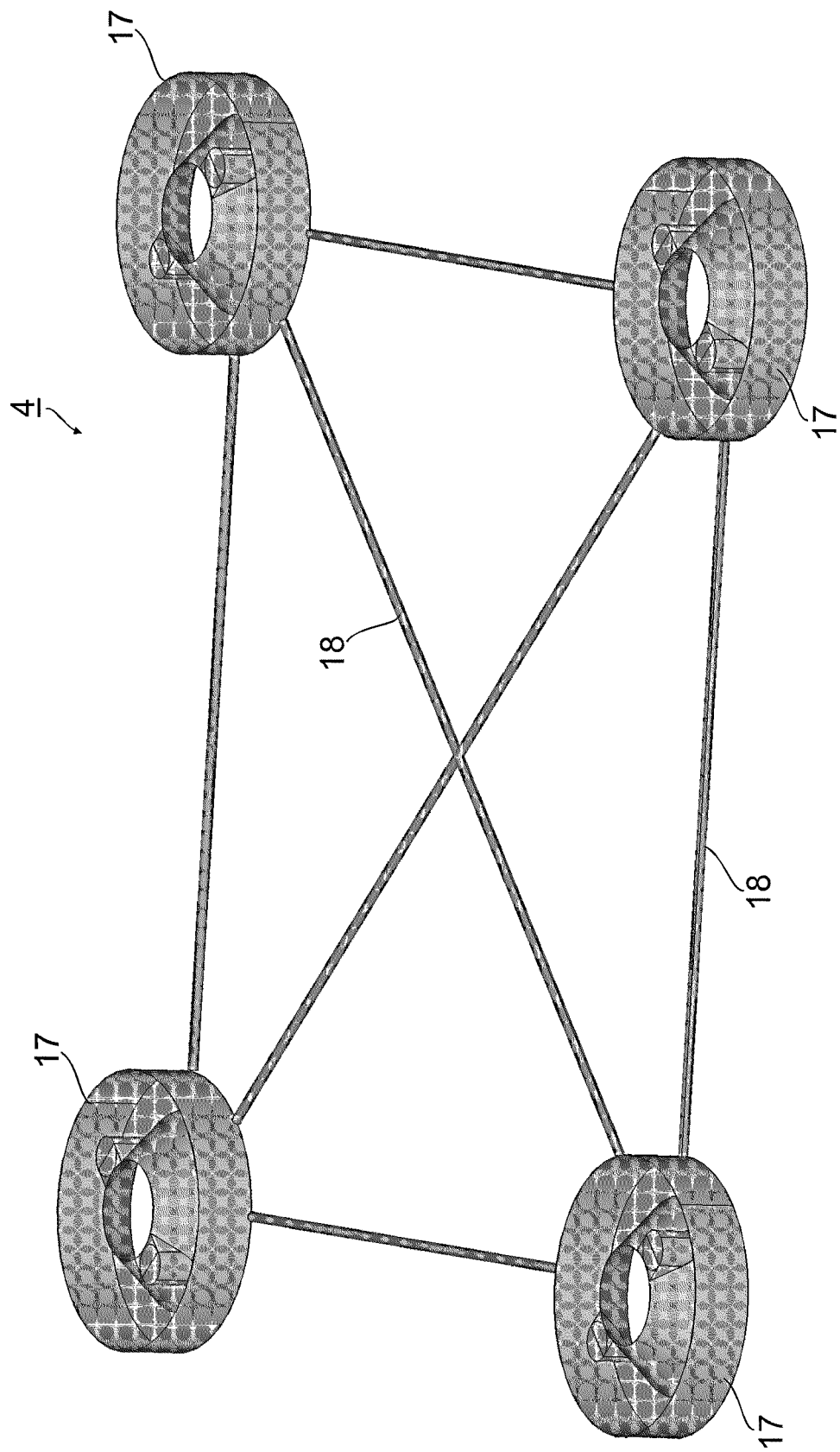
FIG. 3 illustrates a perspective view of an anchor container structure according to the embodiment.

Next, the anchor container structure 4 will be described below with reference to FIG. 3. FIG. 3 illustrates a perspective view of the anchor container structure 4. As shown in FIG. 3, the anchor container structure 4 is connected to the floating structure 3 via the tethers 5 and installed on the seabed. The anchor container structure 4 includes four containers 17. Each of the containers 17 is filled with heavy materials including at least one of soil, sand, gravel, crushed stone, and concrete pieces. The respective containers 17 are connected to each other by connecting cables 18. The connecting cables 18 serve to suppress the misalignment of the four containers 17 with respect to each other. When lowering the anchor container structure 4 to the seabed, the same number of tugboats as the containers 17 are first prepared, and then the tugboats and the containers 17 are tied together with ropes. Then, the containers 17 are lowered into the sea while tension is applied to the connecting cables 18 by pulling the anchor container structure 4 outward from its center. Thus, the containers 17 can be lowered into the sea while maintaining the positional relationship between the containers 17.

(The Container 17)

Figure 4:
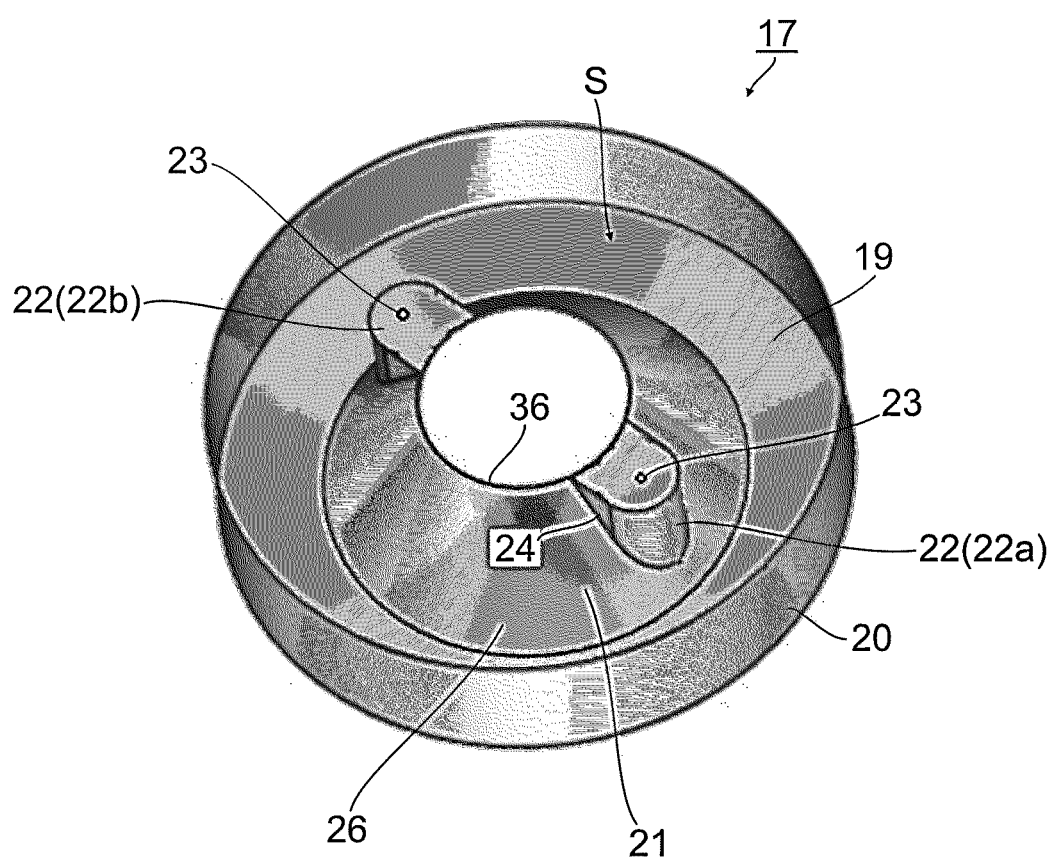
FIG. 4 illustrates a perspective view of a container.
Figure 5B:
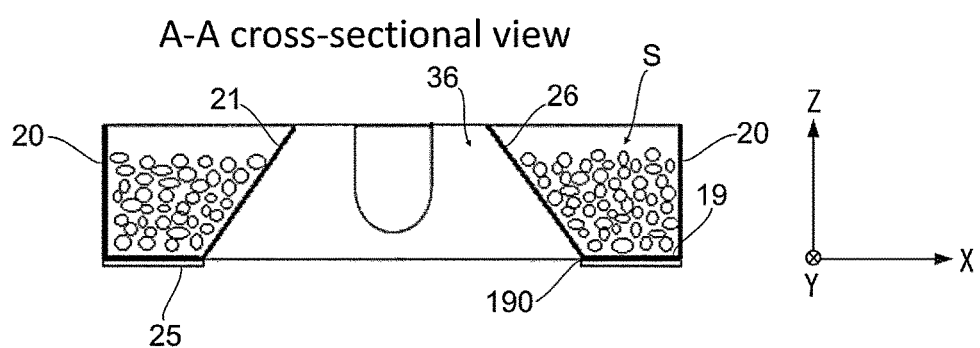
FIG. 5B illustrates an A-A cross-sectional view of the container.
Figure 5A:
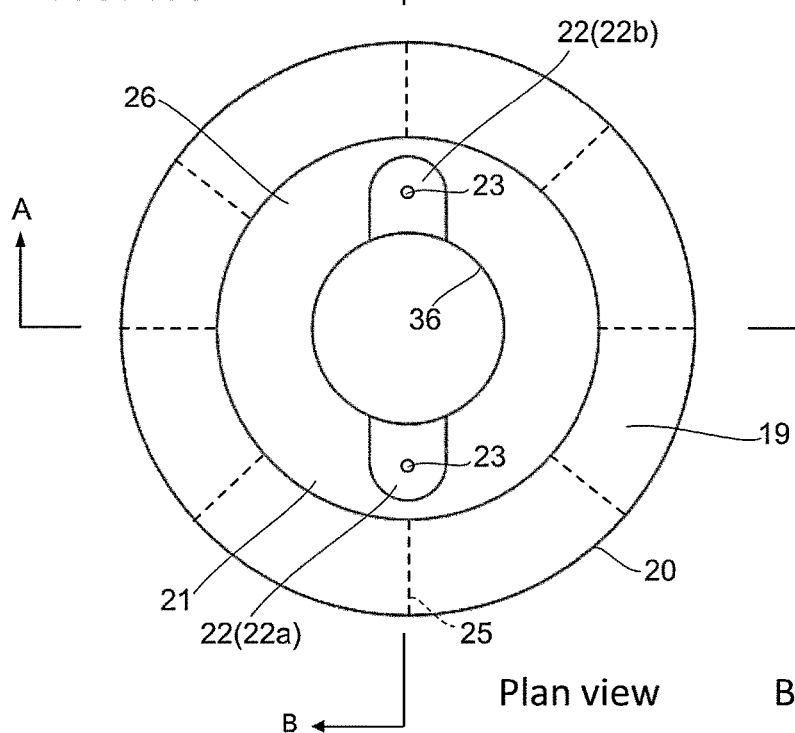
FIG. 5A illustrates a plan view of the container.
Figure 5C:
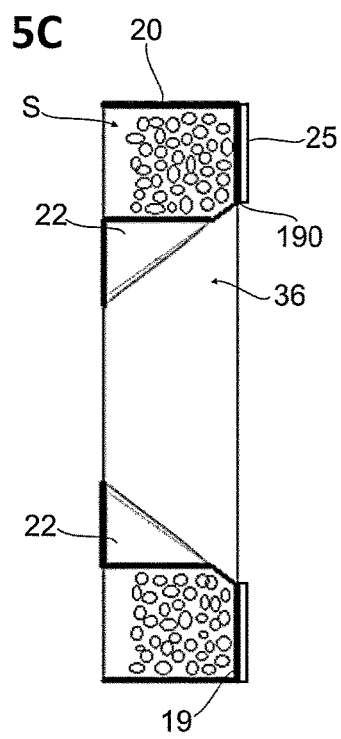
FIG. 5C illustrates a B-B cross-sectional view of the container.

Next, the container 17 will be described below with reference to FIGS. 4 and 5. FIG. 4 illustrates a perspective view of the container 17. FIG. 5A illustrates a plan view of the container 17. FIG. 5B illustrates an A-A cross-sectional view of the container 17. FIG. 5C illustrates a B-B cross-sectional view of the container 17. In the container 17, the periphery of the bottom 19 is surrounded by the container outer wall 20. The top of the container 17 is opened, so that heavy materials such as earth and sand can be dropped from the top. The X, Y, and Z axes set for the container 17 are shown in FIGS. 5A to 5C. One of the X, Y, and Z axes is orthogonal to the other axes. The Z axis corresponds to the vertical direction of the container 17. The horizontal direction perpendicular to the Z axis, which corresponds to the vertical direction of the container 17, is parallel to the X and Y axes.

As shown in FIGS. 4 and 5A to 5C, the container 17 includes a bottom 19, a container outer wall 20, a container inner wall 21, and a pair of tether support members 22. The bottom 19 has a circular opening 190. The container outer wall 20 is provided to surround the periphery of the bottom 19. The container inner wall 21 is provided to surround the inner circumference of the bottom 19 (in other words, the outer circumference of the opening 190), and is also provided to face the container outer wall 20. The pair of tether support members 22 are formed on the container inner wall 21. At least one tether 5 (one tether 5 in this embodiment) is fixed to the tether support members 22. The bottom 19, the container outer wall 20, and the container inner wall 21 form the housing space S. The housing space S houses heavy materials including at least one of soil, sand, gravel, crushed stone, and concrete pieces.

(The Container Inner Wall 21)

The container inner wall 21 has a cavity 36. The cavity 36 is communicated with the opening 190 in the bottom 19 and is opened at its top. The cavity 36 provides a shelter for small fish from strong ocean currents and is also expected to serve as a reef. The inner surface 26 of the container inner wall 21 facing the container outer wall 20 is inclined to the Z-axis direction (vertical direction) of the container 17 (see FIG. 5A). The distance between the container inner wall 21 and the container outer wall 20 in the horizontal direction (XY direction) perpendicular to the Z-axis direction gradually decreases toward the bottom 19. As the position in the Z-axis direction approaches the bottom 19, the diameter of the container inner wall 21 gradually increases. Thus, the distance between the container inner wall 21 and the container outer wall 20, which corresponds to the difference between the radius of the container outer wall 20 and that of the container inner wall 21, also gradually decreases (see FIGS. 5A and 5B).

In case where there is no container inner wall in the container 17, the center of the bottom 19 is far away from the side wall, which is necessary to support the container 17 from below with a high-strength member. By providing the container inner wall 21 that forms the side surface of a cylinder, rectangular prism, cone, pyramid, truncated cone, or truncated pyramid near its center, the container inner wall 21 itself serves as a high strength member. Further, the bones 25 that support the bottom 19 from below can be made short and thin, which contributes to reduction in the weight of the bones 25. If the maximum tensions on the respective tethers 5 connected to the container 17 are different among the tethers 5, shifting the position of the container inner wall 21 toward the tether 5 whose tension is relatively weak can be advantageous in reducing the required amount of heavy material such as earth and sand.

(Tether Support Members 22)

A tether support member 22a (an example of a first tether support member) and a tether support member 22b (an example of a second tether support member) of the pair of tether support members 22 are provided on the inner surface 26 of the container inner wall 21 and face each other through the cavity 36 formed in the container inner wall 21. The number of tether support members 22 provided in the container 17 is not limited. With the tether support members 22 provided on the container inner wall 21, a strong mooring force can be transmitted to the container 17. The top surfaces of the tether support members 22 are formed with tether fixing portions 23 for fixing the tethers 5. When heavy materials such as earth, sand, etc. are dropped into the container 17 installed on the seabed from a ship 32 using a heavy material dropping hose 30, the tethers 5, which extend straight from the container 17 to the floating structure 3 on the water surface, may interfere with the heavy material dropping hose 30 (see FIG. 12, etc.). The tether support members 22 having the tether fixing portions 23 that pulls in the floating structure 3 are provided on the container inner wall 21, not on the container outer wall 20. Accordingly, the heavy material dropping hose 30 can be placed outside the container inner wall 21 upon dropping heavy materials such as earth and sand. As such, it is possible to prevent a situation that the heavy material dropping hose 30 and the tethers 5 interfere with each other. In addition, an area where heavy materials such as earth and sand are dropped is located outside of the tether fixing portions 23. Thus, the volume for housing the required amount of earth, sand, and other heavy materials can be easily adjusted by changing the diameter of the container outer wall 20 at the design stage, regardless of the shape of the floating structure 3 or the fixed positions and number of the tethers 5.

(The Strength Effectiveness of the Tether Support Member 22)

Figure 6:
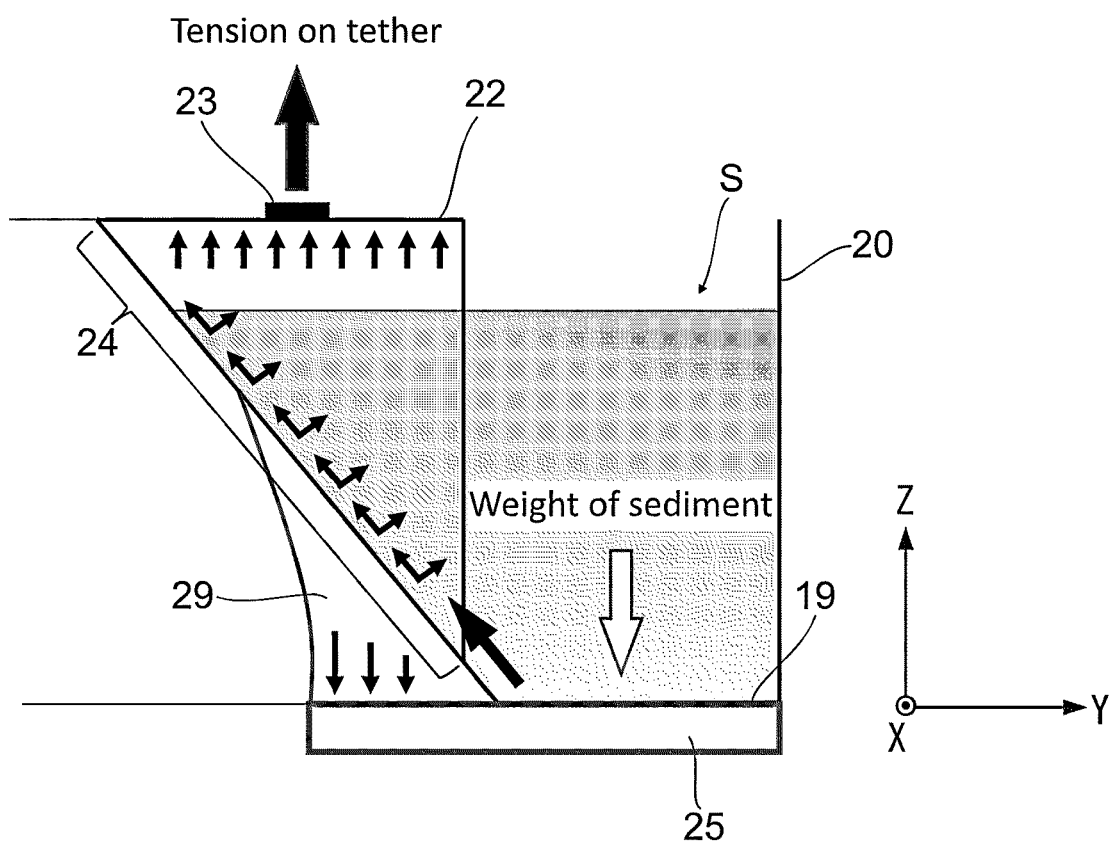
FIG. 6 is a view to describe the propagation of loads in the container.

Next, the strength effectiveness of the tether support member 22 will be described below with reference to FIG. 6. FIG. 6 is a view to describe how the load generated from the tension of the tether 5 propagates through the container 17. The high tension applied to the tether 5 is transmitted to the tether support member 22 through the tether fixing portion 23, and then to the bones 25 through the container inner wall 21. Thus, the high tension becomes a force that supports heavy materials such as earth and sand from below by the bottom 19. The entire series of paths must be strong enough to withstand a load large enough to lift heavy materials such as earth and sand filled in the container 17. In this regard, the load of the tether 5 can be received by the entire of the tether support member 22 by forming the peripheral part of the tether fixing portion 23 of the tether support member 22 as a large casting. In the meanwhile, since most of the container 17 is made of steel plate, it is necessary to prevent damage to the container 17 by distributing the load throughout the above entire series of paths.

In this embodiment, the tether support members 22 are connected to the container inner wall 21 with conical sides via a long welding line 24. The vertical tension of the tether 5 is transmitted directly to the tether support member 22 as a vertical force, which is distributed over the entire area of the long welding line 24. This force can be broken down into in-plane direction component and out-of-plane direction component of the container inner wall 21. Since plates are generally quite resistant to in-plane force, the in-plane force can be ignored in view of the strength design. Regarding the force of the out-of-plane direction component as described above, when the container inner wall 21 has curved or bent edges, the buckling strength is greatly improved compared to a simple flat surface, which results in the reduction in the use of reinforcement members.

Next, the force transmitted to the container inner wall 21 is transferred to the bones 25. In this case, the bones 25 are connected to the container inner wall 21 as cantilevers, which requires brackets 29 on the inside of the container inner wall 21. The bones 25 are arranged between the container inner wall 21 and the container outer wall 20. This allows the length of the bone 25 to be much shorter than that of the bone 25 connecting one side of the container outer wall 20 and the opposite side of the container outer wall 20 in case of no container inner wall 21. Thus, it is possible to reduce the size of the bone 25 and the amount of steel used. Finally, the bones 25 serve to support heavy materials such as earth and sand from below through the bottom 19.

(Gripping Force of the Bones 25)

The bones 25 for reinforcement are radially arranged on the lower surface of the bottom 19. The bones 25 serve as spikes that protrude into the seabed and are advantageous in resisting horizontal forces applied from the tethers 5 to the anchor container structure 4. By providing reinforcing members such as the bones 25 on the outer surface of the container 17 and eliminating protrusions on the inner surface of the container 17, which is surrounded by the container outer wall 20, the container inner wall 21, and the bottom 19, it becomes easier to collect the heavy materials such as earth and sand that are dropped into the container 17, which is necessary when removing the floating platform 2 for supporting the tower 1 from its installation area.

(Reef Effect)

Figure 7:
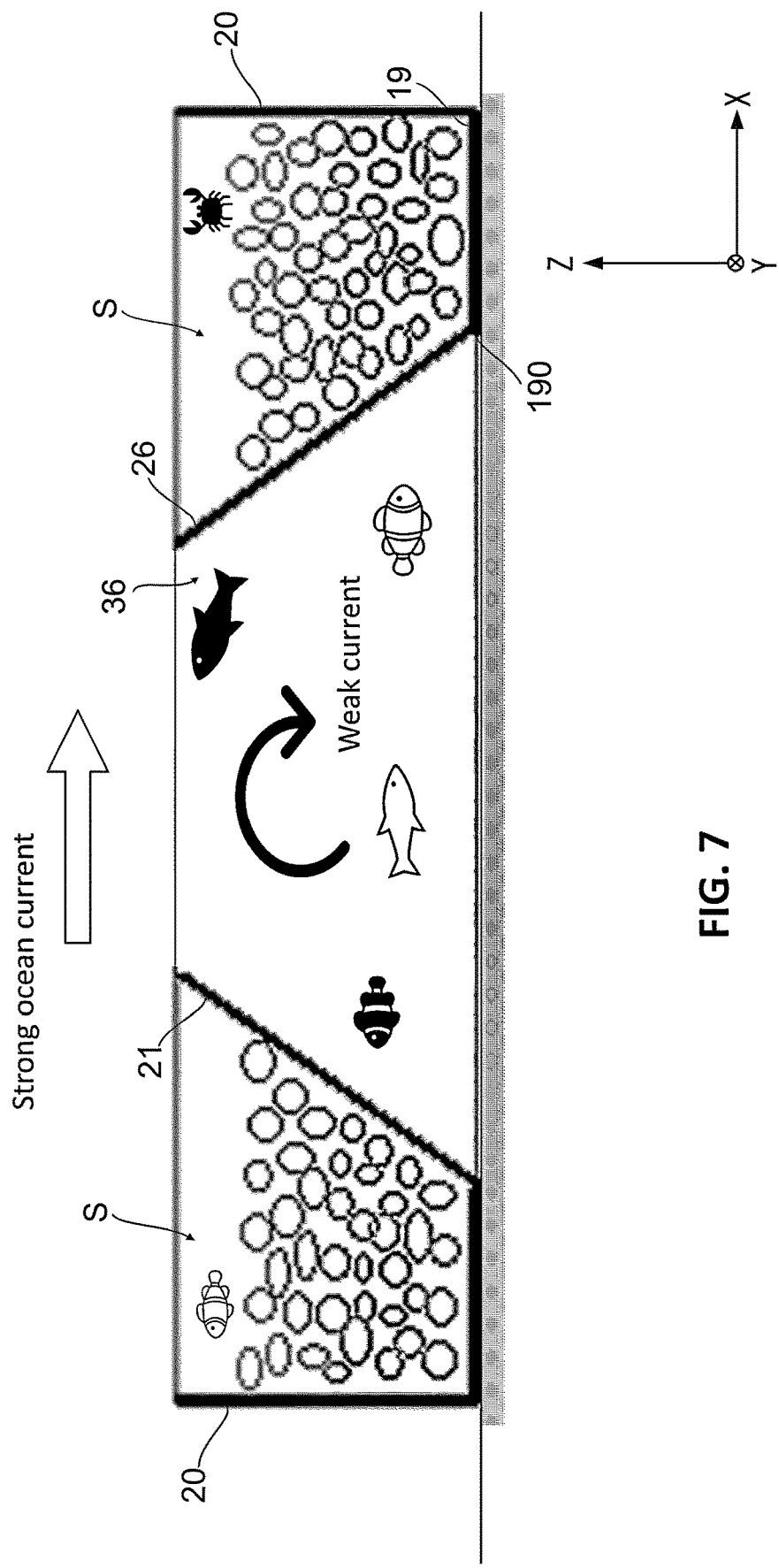
FIG. 7 is a view to describe the reef effect of the container.

FIG. 7 is a view to describe the reef effect of the containers 17. It is known that oysters and seaweed adhere to the floating structure 3 during operation and thus the floating structure 3 serves as a reef. Regarding the containers 17, which are installed on the seabed, the surface of the heavy materials such as earth and sand that are filled in the containers 17 eventually becomes roughly the same condition as the seabed, and thus becomes a habitat for benthic organisms. The water quality in the cavity 36 of the container inner wall 21 is secured by the effective exchange of sea water in the cavity 36 through the opening formed in the cavity 36. Thus, the cavity 36 serves as a valuable space where small fish and various other fish can take refuge from storms and strong ocean currents.

(The Main Part of the Floating Structure 3)

Figure 8:
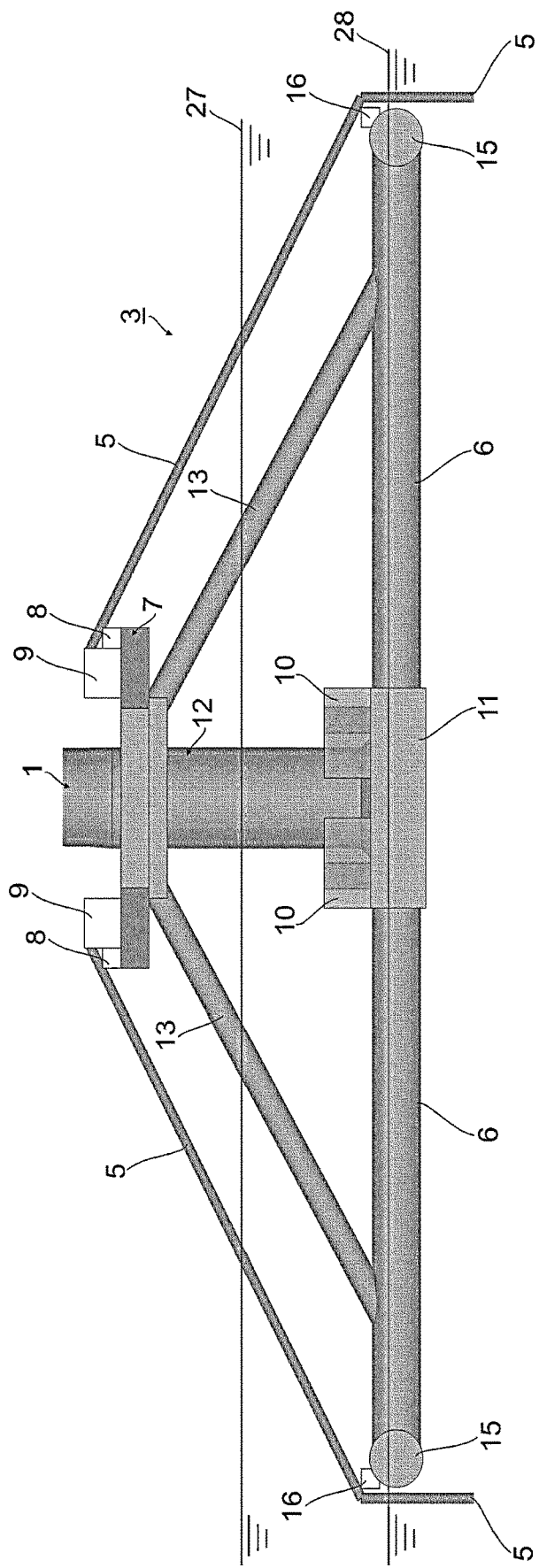
FIG. 8 illustrates a side view of a floating structure.
Figure 9:
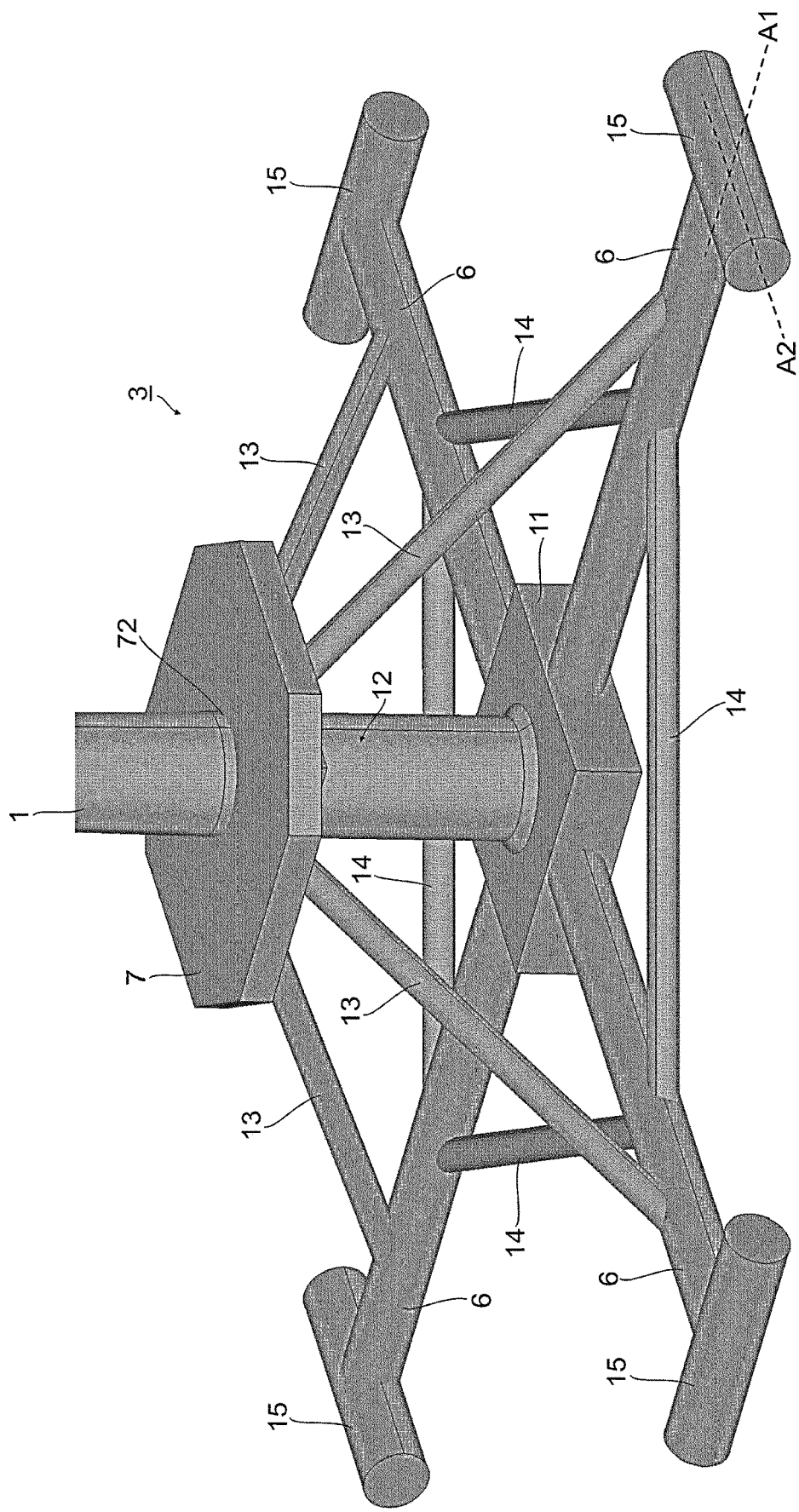
FIG. 9 illustrates a perspective view of the main part of the floating structure.

Next, the floating structure 3 will be described below with reference to FIGS. 8 and 9. FIG. 8 illustrates a side view of the floating structure 3. FIG. 9 illustrates a perspective view of the main part of the floating structure 3. In FIG. 8, arms 6, first braces 13, second braces 14, and grips 15, which extend in a direction perpendicular to this sheet are not shown for the sake of the explanation.

As shown in FIGS. 8 and 9, the floating structure 3 is placed on the sea surface while being moored by a taut mooring system. The floating structure 3 is configured to support the tower 1. The floating structure 3 includes a core column 12, a base 11, the arms 6, the grips 15, guides 16, a stage 7, the first braces 13, the second braces 14, tether securing devices 8, and tether winders 9.

The core column 12 is configured to support the tower 1. The tower 1 is fixed onto the top of the core column 12 by bolts and nuts or other fastening means. The core column 12 is disposed on the base 11. A tether storage space 10 in which the tethers 5 are stored is also mounted on the base 11. The arms 6 (four arms 6 in this embodiment) extend radially from the base 11. In this regard, in case where the base 11 is not provided on the floating structure 3, the four arms 6 may extend radially from the core column 12. Each arm 6 may extend in a direction parallel to the horizontal direction which is orthogonal to the vertical direction of the floating structure 3 (the extension direction of the tower 1). As shown in FIG. 8, the top surface of each arm 6 may be flush with each other.

Each of the grips 15 (four grips in this embodiment) is connected to one end of a corresponding one of the four arms 6. The axial direction A2 of each grip 15 is substantially or completely orthogonal to the axial direction A1 of the corresponding arm 6 and the axial direction of the core column 12 (see FIG. 8). Similarly, the axial direction A1 of each arm 6 is substantially or completely orthogonal to the axial direction of the core column 12. Each of the guides 16 (eight guides in this embodiment) is placed on a corresponding one of the four grips 15. As shown in FIG. 2, in this embodiment, two guides 16 are located on each of the grips 15. Each of the guides 16 contacts a corresponding one of the tethers 5 and is also configured to change the extension direction of the corresponding tether 5. Each tether 5 is bent by the corresponding guide 16.

The stage 7 is fixed to the core column 12. In particular, the stage 7 is disposed between the tower 1 and the base 11 in the vertical direction of the floating structure 3. The stage 7 is fixed to the core column 12 in a state that the core column 12 is inserted into a through hole 72 formed in the stage 7. Each of the first braces 13 (four first braces 13 in this embodiment) is connected to the stage 7 and a corresponding one of the four arms 6. Each of the first braces 13 may also be connected to the corresponding one of the four arms 6 and the core column 12. Each of the first braces 13 extends at an angle with respect to the vertical direction of the floating structure 3.

Each of the second braces 14 (four second braces 14 in this embodiment) is disposed between two adjacent arms 6. One end of each second brace 14 is connected to one of the two adjacent arms 6. The other end of each second brace 14 is connected to the other of the two adjacent arms 6. Each of the second braces 14 may extend in a direction parallel to the horizontal direction of the floating structure 3.

Each of the tether securing devices 8 (eight tether securing devices 8 in this embodiment) is disposed on the stage 7 (see FIG. 2). Each of the tether securing devices 8 is configured to secure a corresponding one of the eight tethers 5. Each of the tether winders 9 (eight tether winders 9 in this embodiment) is disposed on the stage 7 (see FIG. 2). Each of the tether winders 9 is configured to wind and unwind a corresponding one of the eight tethers 5.

(Key Design Points for the Floating Structure 3)

The following points can be considered to reduce the construction cost of the floating structure 3.

(1) Reduction in the maximum tension applied to the tethers 5 during operation.

(2) Reduction in the amount of ballast water carried during operation to reduce the weight of the steel materials of the floating structure 3.

(Reduction in the Maximum Tension Applied to the Tethers During Operation)

When the floating structure 3 is floating at the second draft line 27 in the absence of wind, waves, or swells, a portion of the buoyancy force can be canceled by loading ballast water, and thus the tension applied to the tethers 5 can be adjusted to the initial tension assumed at the time of the design. On the other hand, when the tower 1 for wind power generation is mounted on the floating structure 3 during strong winds, strong horizontal forces are applied to the top of the tower 1 due to wind pressure. This force causes a large moment on the floating structure 3 floating on the water surface according to the following equation. It should be noted that L can be read as the distance from the floating structure 3 to the top of tower 1, and Fn can be read as the wind pressure.

$$M = L \times Fn$$

where M indicates the moment, L indicates the distance from a fulcrum to a force point, and Fn indicates the force component in a direction perpendicular to a line connecting the fulcrum and force point.

This moment needs to be supported by the tension generated in the tethers 5. According to the above equation, L can be read as the distance of the tethers 5, and Fn can be read as the tension applied to the tethers 5. Accordingly, it can be found that it is effective to increase the distance L of the tethers 5 to reduce the tension Fn. For this reason, the arms 6 are extended as far as the strength allows in the embodiment.

In this embodiment, one container 17 is designed to be pulled with two tethers 5. Thus, it is possible to withstand tension up to the upper limit of the tensile strength of the two tethers 5 by placing the guides 16 each corresponding to one of the tethers 5 at the same distance from the center of the base 11. To arrange two guides 16, the grip 15 is provided at the end of the arm 6.

In the meanwhile, the tension applied to the tethers 5 is also increased by the increase in buoyancy due to the temporary rise in water level caused by waves and swells. Therefore, in order to reduce the maximum tension of the tethers 5, it is important to minimize the horizontal cross-sectional area (hereinafter referred to as "waterplane area") of the floating structure 3 at the second draft line 27 to suppress the increase in buoyancy force due to the rise in water level. In this embodiment, the diameter of the core column 12 and the first braces 13 should be minimized to the extent possible in terms of strength. The first braces 13 are disposed at an angle toward the core column 12 and approach the core column 12 around the second draft line 27, thereby making it possible to suppress the pitching, rolling, and other motions that occur in the floating structure 3 due to waves and swells.

(Reduction in the Amount of Ballast Water Carried During Operation to Reduce the Weight of the Steel Materials of the Floating Structure 3)

If the amount of ballast water can be reduced, the weight of the steel materials used to construct the tanks that carry the ballast water can be reduced, which contributes to lower construction costs. Even when the outer wall of the compartment where ballast water is to be loaded is removed during operation to make it an area outside of the floating structure 3, the buoyancy force generated by the floating structure 3 is not affected. As such, it is preferable to reduce the compartment where ballast water is to be loaded as much as possible. To reduce the amount of ballast water, the following two points can be considered.

(1) The floating structure can float stably at the first draft line 28 without ballast water when towed.

(2) The displacement between the first draft line 28 and the second draft line 27 is minimized.

(Matters to be Considered to Ensure that the Floating Structure can Float Stably without Ballast Water when Towed)

"Floating without ballast water" means that the buoyancy force is equal to the weight of the floating structure 3 at the first draft line 28. Namely, since the weight of the floating structure 3, which is made of steel materials, is roughly equal to the weight of the steel materials, it is necessary to adjust the dimensions of each part of the floating structure 3 so that the buoyancy force is equal to the weight estimated in advance. Therefore, the volume (displacement) of the floating structure 3 below the first draft line 28 should be restricted.

"Floating stably" means that the floating structure 3 can recover sufficiently even if the floating structure 3 is subjected to sway due to waves or swells or to overturning moments caused by wind when towed. To achieve this, it is necessary to ensure the waterplane area that is located away from the core column 12 by extending the arms 6 as far as possible and arranging the grips 15 at the ends of the arms 6. Extending the arms 6 as far as possible with buoyancy restriction (the volume of the floating structure 3 below the first draft line 28) means that the arms 6 should be shaped like long and thin rods. In this situation, since the arms 6 are not strong enough, it is necessary to provide the first braces 13 which support the arms 6 in the vertical direction and the second braces 14 which support the arms 6 in the horizontal direction. In this regard, since the second braces 14 are also subjected to the above buoyancy restriction, the second braces 14 should be as thin as possible.

The first braces 13 should also be as thin as possible in view of the requirement to minimize the displacement between the first draft line 28 and the second draft line 27. In this regard, when the arms 6, the first braces 13, and the second braces 14 are made thinner, it is preferable to evaluate the strength of these members and to confirm that they retain sufficient strength to prevent damage during towing and operation. "Floating stably without ballast water when towed" means that the floating platform 2 can be towed independently to the installation area by multiple tugboats only, without the use of a large support vessel. This is advantageous in reducing the installation cost of the floating platform 2.

(Effect of the Containers 17 Under Tow on Stability)

Figure 10:
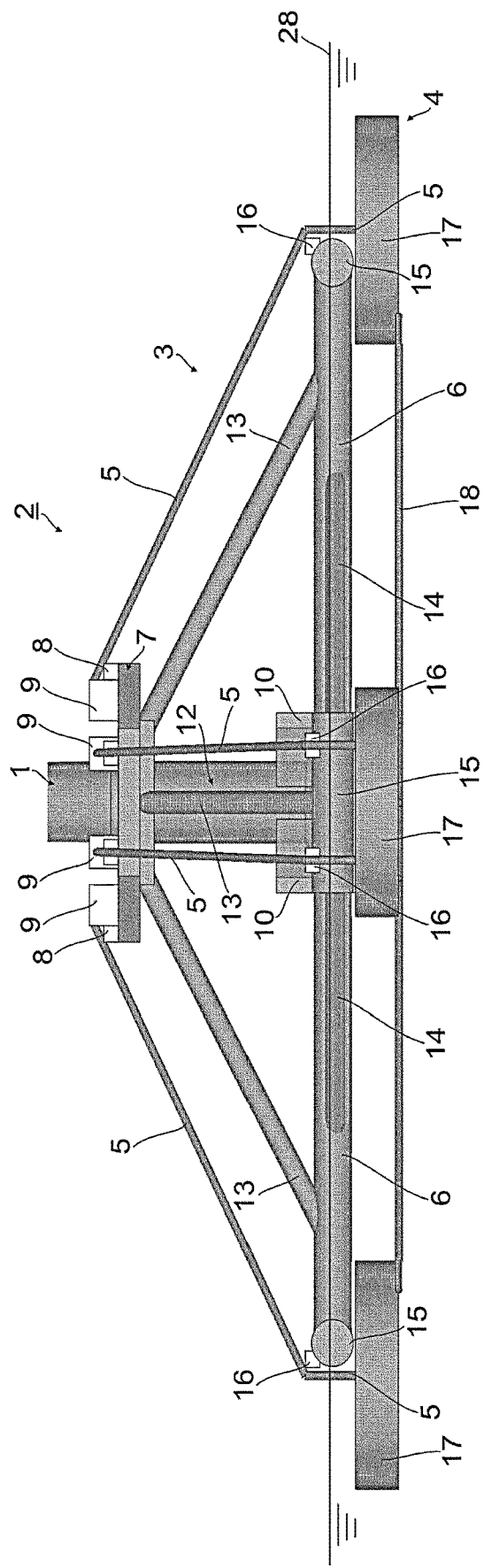
FIG. 10 illustrates the storage position of the anchor container structure during launching and towing.

As shown in FIG. 10, the containers 17 are fixed directly under the arms 6 and grips 15 during towing. If the floating structure 3 tilts significantly during towing, one of the grips 15 may be completely above the water surface, and the other of the grips 15 located on the opposite side via the core column 12 may be completely submerged. In such a case, some of the containers 17 fully submerged are above the water surface. In this case, the top surface of the container 17 has a waterplane area. When the floating structure 3 is tilted further to lift the container 17, a large restoring force is generated in proportion to the waterplane area of the container 17, and as a result, the container 17 is hardly lifted. As such, to further tilt the floating structure 3, it is necessary to sink a member with a large waterplane area, including the base 11 located under the core column 12. This makes the tilt of the floating structure 3 less likely to occur. In other words, if the floating structure 3 tilts significantly during towing due to waves or swells, it is expected that a greater restoring force than usual generated by the containers 17 prevents the floating structure 3 from capsizing.

(Axial Symmetry of the Floating Structure 3)

In the process of sinking the floating structure 3 from the first draft line 28 to the second draft line 27, the horizontal position of the center of gravity for the increased displacement must match the horizontal position of the center of gravity when the floating structure 3 floats at the first draft line 28. If both horizontal positions do not match with each other, ballast water must be loaded to compensate for the difference therebetween. In this embodiment, the core column 12 and the base 11 are placed directly under the tower 1. The axes of the core column 12 and the base 11 may coincide with that of the tower 1. Some of the members constituting the floating structure 3 may be arranged axisymmetrically with respect to the axis of the tower 1.

(Minimization of the Displacement Between the First Draft Line 28 and the Second Draft Line 27)

The floating structure 3 floats at the first draft line 28 without ballast water. To sink the floating structure 3 to the second draft line 27, it is necessary to load ballast water with a weight at least equal to the increased displacement minus the initial tension on the tethers 5. Specifically, the following relationship shall be established.

(The weight of ballast water)=(The displacement from the first draft line 28 to the second draft line 27)+(The weight of the anchor container structure 4)−(Total initial tension on the tethers 5)

It can be seen from the above relationship that it is important to minimize the displacement from the first draft line 28 to the second draft line 27. Specifically, it is necessary to review the following members. However, as described above, the review should be limited to the extent that the members have sufficient strength.

(1) The Freeboard of the Base 11:

To ensure that the base 11 has restoring force enough to quickly rise to the water surface when the base 11 is submerged for a short time due to waves or motion during towing, the base 11 needs to have the volume to a certain height above the water surface. This height is called the freeboard.

(2) The Diameter of the Core Column 12:

In principle, the upper portion of the core column 12 needs to have the same strength as the lower end of the tower 1 in order to receive the large bending moment from the tower 1. Meanwhile, the bending moment is almost dissipated at the lower end of the core column 12. The core column 12 can therefore be shaped as a triangular pyramid with a thicker top and thinner bottom. However, since it is more difficult to fabricate the core column 12 shaped as a triangular pyramid than a cylindrical shape, caution should be taken when evaluating the construction cost.

(3) The Diameter of the Arm 6:

Because the arm 6 is long, a slight thinning of the arm 6 significantly reduces the displacement and the waterplane area at the first draft line 28. In addition, since large compressive forces may be exerted on the arms 6 by the tethers 5 and the first braces 13 during the operation, the diameter of the arm 6 should be determined by evaluating the buckling strength of the arm 6.

(4) The Diameter of the First Brace 13:

The diameter of the first brace 13 should be determined by sufficiently evaluating the strength of the first brace 13 because there is a possibility of buckling due to compressive forces. If ballast water is loaded on the grips 15 during the operation to offset buoyancy, the possibility of compressive forces exerted on the first braces 13 can be greatly reduced.

(5) The Diameter of the Second Brace 14:

The second braces 14 are already largely submerged at the first draft line 28. Therefore, it should be noted the first draft line 28 varies according to change in the diameters of the second braces 14. The forces applied to the second braces 14 are caused due to wind pressure as well as drifting forces caused by ocean currents, waves and swells. The load of the second brace 14 is not as high as that of the first brace 13.

(6) The Diameter of the Grip 15:

Since the grips 15 are important to ensure the restoring force at the first draft line 28, it is necessary to consider the influence on the restoring force in making the diameters of the grips 15 thin.

Matters to consider for the overall configuration of the floating structure 3 are discussed above. Next, matters specific to the individual members constituting the floating structure 3 will be described as necessary.

(The Base 11)

The base 11 serves to ensure buoyancy to support most of the weight of the tower 1 and the core column 12 at the first draft line 28. The tether storage space 10 is also installed on the base 11. Furthermore, it is advantageous in terms of the strength design to allow the arms 6, which are subject to strong forces, to penetrate the base 11. This is because some of the forces can be offset between the two arms 6, which are positioned to face each other.

(The Arm 6)

In this embodiment, four arms 6 extend from the base 11 in four directions. The grip 15 is disposed at the end of each of the arms 6. When the extension direction of the tension exerted on the tether 5 during the operation is changed by the guide 16 placed on the grip 15, a force compressing the arm 6 as well as a force pushing the end of the arm 6 downward is generated. This downward force is transmitted to the first brace 13 that supports the arm 6 in the vertical direction, and thus the arm 6 is supported by the first brace 13. Furthermore, a bending moment is generated at the connection between the arm 6 and the first brace 13. Since this bending moment occurs repeatedly due to fluctuations in wind pressure and other factors, fatigue cracks are likely to occur on the upper surface of the connection between the arm 6 and the first brace 13. Accordingly, it is preferable to consider the fatigue strength at the design stage. In some cases, the thickness of the arm 6 and the connection position between the arm 6 and the first brace 13 may be reviewed. In principle, the same consideration should be given to the connection position between the arm 6 and the second brace 14. It is also possible to configure all or part of the arm 6 as a void compartment to counteract some of the force pushing the end of the arm 6 downward as described above.

(The Grip 15)

In this embodiment, the grip 15 is attached to the end of the arm 6. The guide 16 for bending the tether 5 is disposed on the grip 15. As described above, the grips 15 allow the floating structure 3 to secure the restoring force when the floating structure 3 floats at the first draft line 28 during towing. On the other hand, when the floating structure 3 floats at the second draft line 27 during the operation, the entire volume of the grips 15 becomes buoyancy force, which greatly exceeds the downward force generated by bending the tethers 5. This gives excessive load to the arms 6 and the first braces 13. Therefore, w % ben the floating structure 3 floats at the second draft line 27 during the operation, it is more advantageous for the strength design of the floating structure 3 to load the grips 15 with ballast water and employ the grips 15 as ballast tanks. This is more advantageous in reducing the weight of the steel materials of the floating structure 3.

(The Guide 16)

In this embodiment, the tether securing devices 8 for securing the tethers 5 are provided on the stage 7 attached to the core column 12. The tether 5 extends straight from the tether fixing portion 23 of the container 17, and then is caused to change its extension direction at the guide 16. After that, the tether 5 extends diagonally upward toward the tether securing device 8 provided on the stage 7. With the change in the extension direction of the tether 5, the guide 16 is subjected to horizontal and vertical forces proportional to the tension. When the floating structure 3 is subjected to wind pressure, the tether 5 may also be subjected to lateral forces. Following this, the guide 16 is also subjected to these lateral forces. A mechanism to prevent the tether 5 from coming off the guide 16 may be provided in the guide 16.

(The Stage 7)

The stage 7 is rigidly fixed to the core column 12 at a position above the arms 6 and higher than the second draft line 27. To reduce the number of times the stage 7 is exposed to green sea during severe storms, it is advantageous to provide the stage 7 at a higher position. When the tower 1 for offshore wind power generation is provided on the core column 12, the position of the stage 7 can be determined in view of ensuring a clearance between the ends of the blades 40 and the stage 7. It is preferable to design the stage 7 on the premise that it will be exposed to green sea. For example, in case where deep beams are provided on the stage 7, it is preferable to form large light holes in the stage 7. It is also preferable to minimize the deck area on the stage 7. If it is unavoidable to install decking on the stage 7, a grating or other structure that allows water to pass through may be provided on the stage 7.

(The Tether Securing Device 8)

The tether securing device 8 is provided on the stage 7 in the vicinity of the tether winder 9. The tether securing device 8 receives the tension exerted on the tether 5. For this reason, the tether securing device 8 may be rigidly fixed to the stage 7. Also, the stage 7 is attached to the core column 12. For this reason, in case where the tether securing devices 8 are located away from the core column 12, a large moment will be generated at the fixing position between the stage 7 and the core column 12. Therefore, it is preferable that the tether securing devices 8 should be provided as close to the core column 12 as possible. The distance between two adjacent tether securing devices 8 located on the stage 7 may be shorter than the distance between two adjacent guides 16. In this case, two tethers 5 extending from one of the grips 15 to the stage 7 may not be parallel to each other.

(The Tether Winder 9)

The tether winders 9 are provided on the stage 7. The tether winder 9 is configured to: pay out the tether 5 when lowering the anchor container structure 4 to the seabed; adjust the initial tension of the tether 5 during operation; and wind up the tether 5 when removing the floating platform 2 that supports the tower 1. When the initial tension of the tether 5 is adjusted, the tether 5 may be slightly wound up using the tether winder 9 to remove the load on the tether securing device 8.

(The Tether Storage Space 10)

The tether storage spaces 10 are provided on the base 11. The tethers 5 are stored in the tether storage spaces 10 when the floating structure 3 is launched or towed. Meanwhile, during the operation of the floating structure 3, most of the tethers 5 are not stored in the tether storage space 10. Therefore, the side walls of the tether storage space 10 may be provided with a lattice or other structure that allows water to pass through easily. In this case, the drifting force applied to the floating structure 3 is reduced, and thus the tension acting on the tether 5 can be reduced.

(The Storage Position of the Anchor Container Structure 4 During Launching and Towing)

Next, the storage position of the anchor container structure 4 during launching and towing will be described below with reference to FIG. 10. FIG. 10 illustrates the storage position of the anchor container structure 4 during launching and towing. When the floating structure 3 is assembled and launched at a shipyard, the anchor container structure 4 is suspended by the tethers 5 beneath the floating structure 3. Also, the floating structure 3 is launched such that the floating structure 3 and the anchor container structure 4 are fixed to each other. In this state, the floating structure 3 floats at the first draft line 28. Most of the tethers 5 are stored in the tether storage spaces 10. When the floating structure 3 floats at the first draft line 28, the floating structure 3 can ensure sufficient restoring force against motions during towing, mainly because of the large cross-sectional secondary moment due to the waterplane surface of the arms 6 and the grips 15. Therefore, the floating structure 3 can be towed by several tugboats without the need for a large barge or support vessel. This is advantageous in reducing the installation cost of the floating platform 2.

Figure 11:
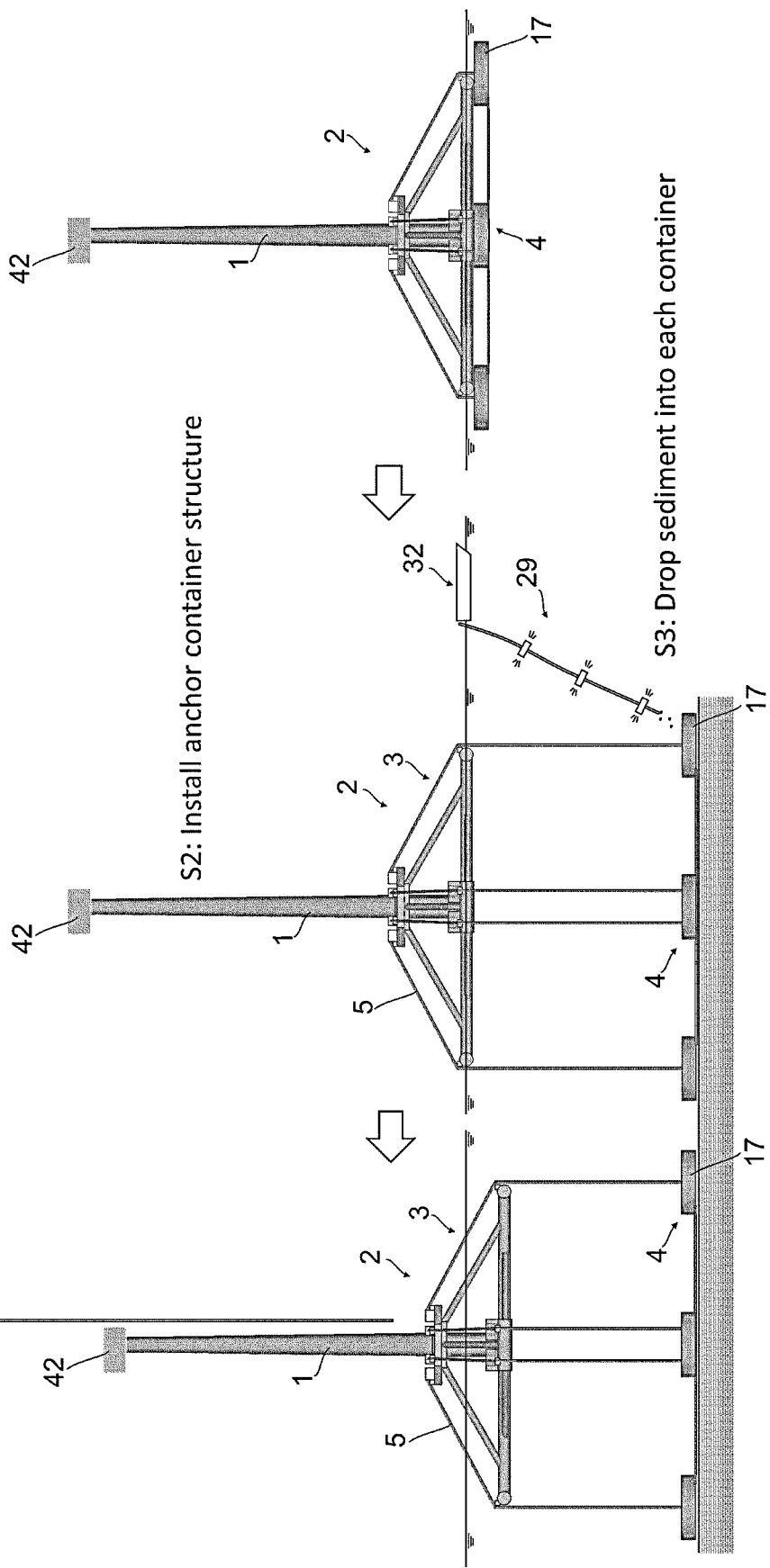
FIG. 11 is a view to describe an installation method for installing the floating platform according to the embodiment.

Next, an installation method of the floating platform 2 according to the embodiment will be described below with reference to FIG. 11. FIG. 11 illustrates the installation method of the floating platform 2 according to the embodiment. FIG. 11 illustrates each step (steps S1 to S4) from launching and towing of the floating platform 2 to installation of the floating platform 2. In step S1, the anchor container structure 4 including the containers 17 is placed directly under the floating structure 3. The floating structure 3 is towed to the planned installation location in a state that the floating structure 3 floats at the first draft line 28.

(Step S2: Install the Anchor Container Structure 4)

When the floating structure 3 arrives at the planned installation location, the anchor container structure 4 is lowered to the seabed by paying out the tethers 5 (in this embodiment, eight tethers 5) into the sea. In order to prevent the containers 17 of the anchor container structure 4 from riding up on a large rock, it is preferable to survey the condition of the seabed in advance and determine the planned location of the anchor container structure 4.

(Step S3: Drop Heavy Materials into Each Container)

Figure 12:
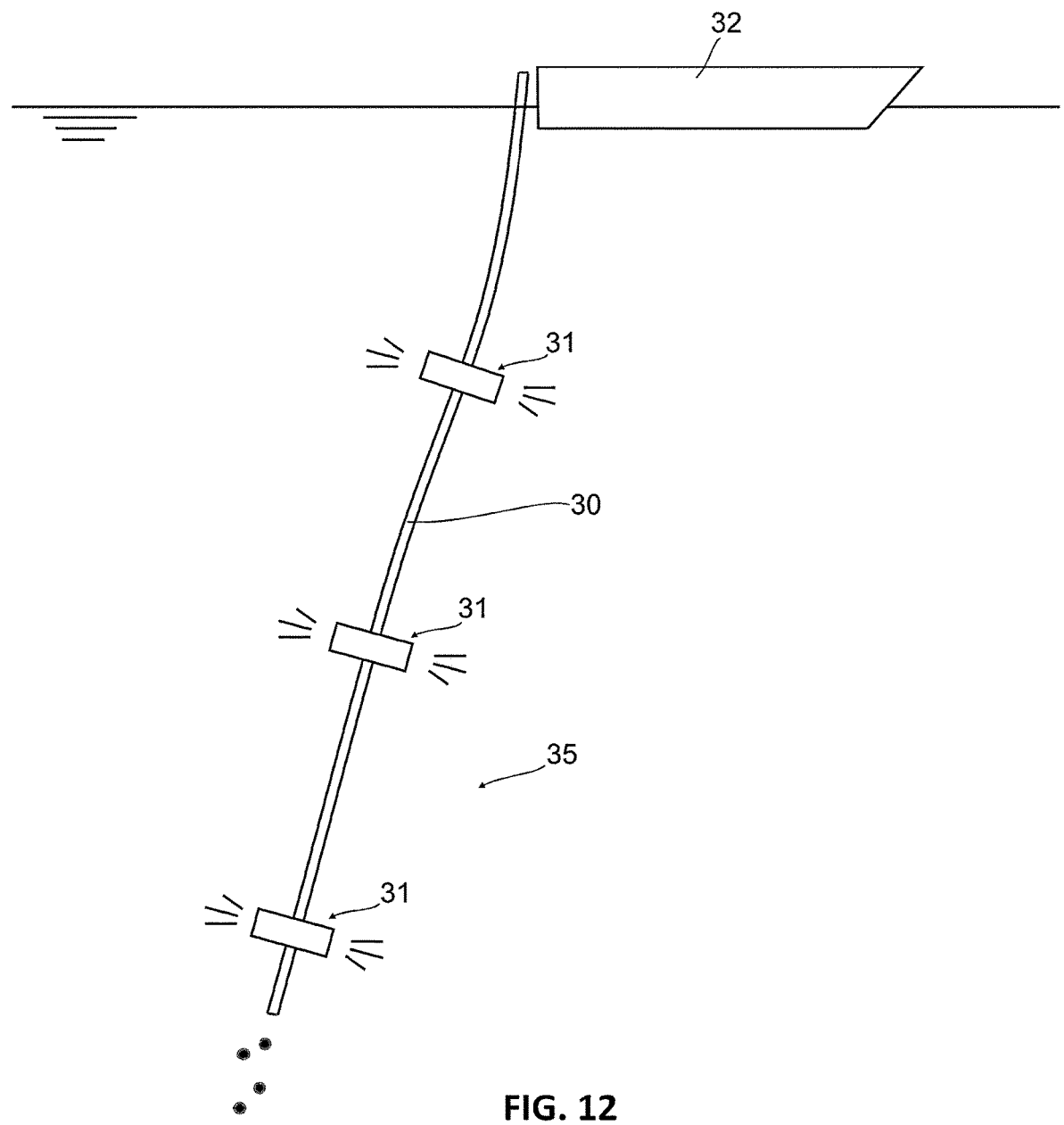
FIG. 12 illustrates an example of a heavy material dropping device.

Heavy materials are dropped from the ship 32 into the housing space S of the four containers 17 installed on the seabed using the heavy material dropping device 35. The heavy materials are, for example, soil, sand, gravel, crushed stone, concrete pieces, etc. Specifically, as shown in FIG. 12, after the heavy material dropping hose 30 is lowered into the sea from the ship 32, the heavy material dropping hose 30 is guided to a predetermined position using three propulsion devices 31 attached to the heavy material dropping hose 30. Specifically, when the end of the heavy material dropping hose 30 arrives at the housing space S of the container 17, the heavy material dropping hose 30 is used to drop the heavy materials into the housing space S.

(Step S4: Install the Floating Platform)

After the heavy materials have been dropped into the containers 17 of the anchor container structure 4, the floating structure 3 is sunk to the second draft line 27 by winding up the tethers 5 using the tether winders 9. When a tension greater than the planned initial tension is generated in the tethers 5, ballast water may be loaded on the floating structure 3 to adjust the tensions of the tethers 5 such that the tensions of the tethers 5 become a predetermined value. Each of the tethers 5 is then fixed to the floating structure 3 using the tether securing devices 8. As such, the floating platform 2 can be installed on the sea using the taut mooring method.

(Restoring Force of the Floating Platform During Installation)

FIG. 8 illustrates the first draft line 28 and second draft line 27 of the floating structure 3. In the step of installing the floating structure 3 by pulling in the tethers 5, the arms 6 and grips 15 of the floating structure 3 submerge under the water surface, which results in that the waterplane area decreases at once and the floating structure 3 loses its restoring power. However, in such a situation, the floating structure 3 does not tip over because the tensions of the tethers 5 are large enough. In this regard, it is preferable not to load ballast water onto the floating structure 3 until the tensions of the tethers 5 become large enough.

(The Heavy Material Dropping Device 35)

FIG. 12 illustrates the heavy material dropping device 35. In order to drop heavy materials such as sediment at a certain location on the seabed, it is preferable to use a means for accurately maintaining the end of the heavy material dropping hose 30 at a targeted position. In this regard, amid disturbances such as wind, waves, and ocean currents, it becomes difficult to quickly guide the end of the heavy material dropping hose 30 to the targeted position simply by controlling the position of the ship 32 traditionally. Therefore, by providing the propulsion device 31 at the end of the heavy material dropping hose 30, it is possible to guide the end of the heavy material dropping hose 30 to the targeted position. It is also preferable to control the shape (underwater posture) of the entire heavy material dropping hose 30 in the water by attaching the propulsion devices 31 (three propulsion devices 31 in this embodiment) onto the heavy material dropping hose 30. In this case, it is possible to more reliably drop the heavy materials from the heavy material dropping hose 30 into the housing space S of the container 17.

(Removal of the Floating Platform 2)

When removing the floating platform 2 that supports the tower 1 from the installation area, each step (steps S1 to S4) shown in FIG. 11 may be performed in reverse order. Thus, it is possible to remove the floating platform 2 without using a large support vessel, as in the installation step of the floating platform 2. In this case, it is necessary to collect heavy materials such as earth and sand contained in the containers 17 by suctioning seawater using the heavy material dropping hose 30. A water jet device or the like may be provided at the end of the heavy material dropping hose 30 to slurry the surface of heavy materials such as sediment filled in the housing space S of the containers 17.

As described above, the floating platform 2 that supports the tower 1 is a taut moored floating platform that includes the floating structure 3, the anchor container structure 4, and the tethers 5 connecting the floating structure 3 and the anchor container structure 4. The anchor container structure 4 is not a large concrete structure as in the past but is configured by the containers 17 that store heavy materials such as inexpensive earth and sand, etc. The floating platform 2 can be towed by tugboats without a large dedicated vessel or barge. This is because the floating platform 2 can stand on its own when towed. Furthermore, the floating platform 2 can be installed without a large support vessel. The tether winders 9 mounted on the floating structure 3 are used to unload the tethers 5 and then the anchor container structure 4 is lowered into the sea. Then, the heavy materials such as earth and sand are dropped into each of the containers 17 from the ship 32 mounted with the heavy material dropping device 35. As such, the floating platform 2 can be installed. Accordingly, it is possible to reduce the construction and installation costs of the floating platform 2. When the floating platform 2 is in operation, the taut mooring makes it possible to greatly suppress the swaying of the floating structure 3. Also, the anchor container structure 4 is expected to have a reef effect, and thus it is possible to realize the floating platform 2 that is effective in stimulating the fishing industry.

Although the embodiment of the present disclosure has been described above, the interpretation of the technical scope of the present invention should not be limited to the description of the present embodiment. The present embodiment is merely an example, and it shall be understood by those skilled in the art that various changes can be made on the embodiment within the scope of the inventions described in the claims. The technical scope of the present invention should be determined based on the scope of the inventions described in the claims and the scopes of equivalents thereof.

This application is supported by the content disclosed in Japanese Patent Application No. 2023-151768, filed on Sep. 19, 2023, as appropriate.

What is claimed is:

1. A floating platform (2) comprising:
   a floating structure (3) configured to support a tower (1) and placed on water by means of taut mooring;
   an anchor container structure (4) comprising a plurality of containers (17); and
   a plurality of tethers (5) connecting the floating structure (3) and the anchor container structure (4),
   wherein each of the plurality of containers (17) is fixed to at least one of the plurality of tethers (5) and placed on a water bottom,
   wherein each of the plurality of containers (17) comprises:
   a bottom (19) having a central opening (190);
   a container outer wall (20) provided around a periphery of the bottom (19); and
   a container inner wall (21) surrounding the central opening (190) and facing the container outer wall (20),
   wherein the bottom (19), the container outer wall (20), and the container inner wall (21) form a housing space (S), and
   wherein heavy materials are contained in the housing space (S), and the heavy materials include at least one of soil, sand, gravel, crushed stone, and concrete pieces.

2. The floating platform (2) according to claim 1, wherein each of the plurality of containers (17) further comprises a tether support member (22) which is formed on the container inner wall (21) and fixed to the at least one of the tethers (5).

3. The floating platform (2) according to claim 2, wherein the container inner wall (21) comprises a cavity (36) which is opened at its top and is communicated with the central opening (190).

4. The floating platform (2) according to claim 2, wherein the tether support member (22) comprises:
a first tether support member (22a) formed on the container inner wall and fixed to one of the tethers (5); and
a second tether support member (22b) formed on the container inner wall and fixed to another one of the tethers (5).

5. The floating platform (2) according to claim 2, wherein the floating structure (3) comprises:
a core column (12) configured to support the tower (1);
a plurality of arms (6) extending radially from the core column (12) or from a vicinity of the core column (12);
a stage (7) fixed to the core column (12);
a plurality of first braces (13) each connected to a corresponding one of the arms, and either the stage (7) or the core column;
a plurality of second braces (14) each connected to two adjacent ones of the arms;
a plurality of tether securing devices (8) each configured to secure a corresponding one of the tethers; and
a plurality of tether winders (9) each configured to wind up the corresponding one of the tethers.

6. The floating platform (2) according to claim 5, wherein the floating structure (3) further comprises:
a plurality of grips (15) each connected to one end of one of the arms, wherein an axial direction of each of the grips is orthogonal to an axial direction of the corresponding arm; and
a plurality of guides (16) each arranged on a corresponding one of the grips (15), wherein each of the guides (16) contacts a corresponding one of the tethers and is configured to change an extension direction of the corresponding tether, and
wherein the tether securing devices (8) and the tether winders (9) are arranged on the stage.

7. The floating platform (2) according to claim 1, wherein an inner surface (26) of the container inner wall (21) facing the container outer wall is inclined with respect to a vertical direction of the container (17), and
a distance between the container inner wall and the container outer wall in a horizontal direction perpendicular to the vertical direction gradually decreases toward the bottom.

8. The floating platform (2) according to claim 1, wherein a nacelle (42) and blades (40) are attached to the tower (1), and
the floating platform is a platform for offshore wind power generation.

9. An installation method for installing the floating platform (2) of claim 1 on water by means of taut mooring, the method comprising:
towing the floating structure (3) to a planned installation location in such a state that the anchor container structure (4) comprising the containers (17) is positioned directly under the floating structure (3), and the floating structure (3) is floating at a first draft line (28);
placing the containers (17) on a water bottom by paying out the tethers (5) into the water at the planned installation location;
dropping the heavy materials into the housing space of each of the containers (17) which is placed at the water bottom, wherein the heavy materials include at least one of soil, sand, gravel, crushed stone, and concrete pieces;
winding up the tethers (5);
submerging the floating structure (3) to a second draft line (27) that is deeper than the first draft line (28);
adjusting tensions of the tethers (5) such that the tensions of the tethers (5) are set to a certain value; and
securing each of the tethers (5) to the floating structure (3).

10. An anchor container structure (4) connected to a floating structure (3) through a plurality of tethers (5), wherein the floating structure is configured to support a tower (1) and placed on water by means of taut mooring,
wherein the anchor container structure (4) comprises a plurality of containers (17),
wherein each of the plurality of containers (17) is fixed to at least one of the tethers (5) and placed on a water bottom,
wherein each of the plurality of containers (17) comprises:
a bottom (19) having a central opening (190);
a container outer wall (20) provided around a periphery of the bottom (19); and
a container inner wall (21) surrounding the central opening (190) and facing the container outer wall (20),
wherein the bottom (19), the container outer wall (20), and the container inner wall (21) form a housing space (S), and
wherein heavy materials are contained in the housing space (S), and the heavy materials include at least one of soil, sand, gravel, crushed stone, and concrete pieces.

11. A floating structure (3) placed on water by means of taut mooring and configured to support a tower (1), the floating structure (3) comprising:
a core column (12) configured to support the tower (1);
a plurality of arms (6) extending radially from the core column (12) or from a vicinity of the core column (12);
a plurality of grips (15) each connected to one end of one of the arms, wherein an axial direction of each of the grips is orthogonal to an axial direction of the corresponding arm;
a stage (7) fixed to the core column (12);
a plurality of first braces (13) each connected to a corresponding one of the arms and the stage (7) or the core column;
a plurality of second braces (14) each connected to two adjacent ones of the arms; and
a plurality of tether securing devices (8) each configured to secure a corresponding one of the tethers.

* * * * *